(12) United States Patent
Tu et al.

(10) Patent No.: US 11,381,794 B2
(45) Date of Patent: Jul. 5, 2022

(54) METHOD FOR TRIGGERING PROJECTION FUSION CALIBRATION AND PROJECTION SYSTEM

(71) Applicant: Coretronic Corporation, Hsin-Chu (TW)

(72) Inventors: Hsun-Cheng Tu, Hsin-Chu (TW); Chien-Chun Peng, Hsin-Chu (TW); Chi-Wei Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/374,987

(22) Filed: Jul. 13, 2021

(65) Prior Publication Data

US 2022/0094895 A1   Mar. 24, 2022

(30) Foreign Application Priority Data

Sep. 18, 2020   (CN) .......................... 202010985713.3

(51) Int. Cl.
*H04N 9/31* (2006.01)

(52) U.S. Cl.
CPC ......... *H04N 9/3194* (2013.01); *H04N 9/3147* (2013.01); *H04N 9/3188* (2013.01)

(58) Field of Classification Search
CPC ... H04N 9/3194; H04N 9/3147; H04N 9/3188
See application file for complete search history.

(56) References Cited

U.S. PATENT DOCUMENTS

| | | | |
|---|---|---|---|
| 7,002,589 B2 | 2/2006 | Deering | |
| 2016/0088276 A1* | 3/2016 | Lin | H04N 9/3194 348/207.1 |
| 2020/0020072 A1* | 1/2020 | Ely | G06T 3/4038 |
| 2020/0134798 A1* | 4/2020 | Cian | G03B 35/20 |
| 2020/0137367 A1* | 4/2020 | Cian | H04N 9/3182 |
| 2021/0127096 A1* | 4/2021 | Lin | H04N 9/3147 |
| 2021/0329202 A1* | 10/2021 | Cian | G06T 3/4038 |
| 2021/0364904 A1* | 11/2021 | Chien | H04N 9/3182 |
| 2021/0392312 A1* | 12/2021 | Bleyer | G06T 7/30 |

FOREIGN PATENT DOCUMENTS

| | | |
|---|---|---|
| CN | 100525475 | 8/2009 |
| CN | 105931188 | 9/2016 |
| CN | 106023074 | 10/2016 |
| TW | 201839717 | 11/2018 |

* cited by examiner

*Primary Examiner* — Paulos M Natnael
(74) *Attorney, Agent, or Firm* — JCIPRNET

(57) ABSTRACT

A method for triggering projection fusion calibration and a projection system is provided, including the following. First and second display contents are projected respectively onto a projection surface by a first projection device and a second projection device and fused into a complete display content including an overlapping area and a first non-overlapping area corresponding to a part of the first display content. A first image on the projection surface is captured, a first sharpness value corresponding to the first non-overlapping area and a specific sharpness value corresponding to the overlapping area based on the first image are obtained, and a first sharpness value difference between the first sharpness value and the specific sharpness value is obtained. In response to determining the first sharpness value difference being greater than a first threshold a fusion calibration operation is triggered, or a fusion calibration prompt is provided.

16 Claims, 3 Drawing Sheets

METHOD FOR TRIGGERING PROJECTION FUSION CALIBRATION AND PROJECTION SYSTEM

CROSS-REFERENCE TO RELATED APPLICATION

This application claims the priority benefit of China application serial no. 202010985713.3, filed on Sep. 18, 2020. The entirety of the above-mentioned patent application is hereby incorporated by reference herein and made a part of this specification.

BACKGROUND

Technical Field

The invention relates to a calibration mechanism of a projector, and in particular to a method for triggering projection fusion calibration and a projection system.

Description of Related Art

The main functions of existing projectors with built-in cameras include interaction, taking images, and performing color calibration and projection fusion functions on the images. Regarding the projection fusion function, as time goes by or if the projector is affected by environmental factors, such as being impacted by an external force, the image quality of image fusion areas may be prone to degradation, such as the image becoming blurred. However, currently, it is only possible to judge whether it is necessary to automatically re-execute an image fusion operation through a sensing device or by human eye.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

Based on the above, the invention provides a method for triggering projection fusion calibration and a projection system.

An aspect of the invention provides a method for fusion calibration and a projection system, which is capable of automatically maintaining the quality of a projection content.

Other objectives and advantages of the invention may be further understood from the technical features disclosed in the invention.

In order to achieve one or part or all of the above objectives or other objectives, an aspect of the invention provides a method for triggering projection fusion calibration. The method includes the following. A first projection device and a second projection device project a first display content and a second display content respectively onto a projection surface, in which the first display content and the second display content are fused into a complete display content presented on the projection surface, and the complete display content includes an overlapping area formed by overlapping the first display content and the second display content and a first non-overlapping area corresponding to a part of the first display content; the first projection device captures a first image on the projection surface where a complete display content is displayed; the first projection device obtains a first sharpness value corresponding to a first non-overlapping area and a specific sharpness value corresponding to an overlapping area based on the first image, and obtains a first sharpness value difference between the first sharpness value and the specific sharpness value; and in response to determining that the first sharpness value difference is greater than a first threshold, the first projection device triggers a fusion calibration operation between the first projection device and the second projection device, or provides a fusion calibration prompt.

In order to achieve one or a part or all of the above or other objects, an aspect of the invention provides a projection system which includes a first projection device, a second projection device, and a projection surface. The first projection device and the second projection device project the first display content and the second display content respectively onto the projection surface. The first display content and the second display content are fused into the complete display content presented on the projection surface. The complete display content includes an overlapping area formed by overlapping the first display content and the second display content and a first non-overlapping area corresponding to a part of the first display content. The first projection device is configured to: capture the first image on the projection surface where the complete display content is displayed; obtain the first sharpness value corresponding to the first non-overlapping area and the specific sharpness value corresponding to the overlapping area based on the first image, and obtain the first sharpness value difference between the first sharpness value and the first specific sharpness value; and in response to determining that the first sharpness value difference is greater than a first threshold, trigger the fusion calibration operation between the first projection device and the second projection device, or provide a fusion calibration prompt.

Based on the above, the invention is capable of automatically maintaining the quality of the projection content.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

The above and other technical contents, features and effects of the invention will be apparent from the following detailed description of a preferred embodiment with reference to the accompanying drawings. Directional wordings mentioned in the following embodiments, such as "up," "down," "left," "right," "front," and "back," merely refer to directions in the accompanying drawings. Therefore, the directional wordings are used to illustrate rather than limit the disclosure.

Figure 1:
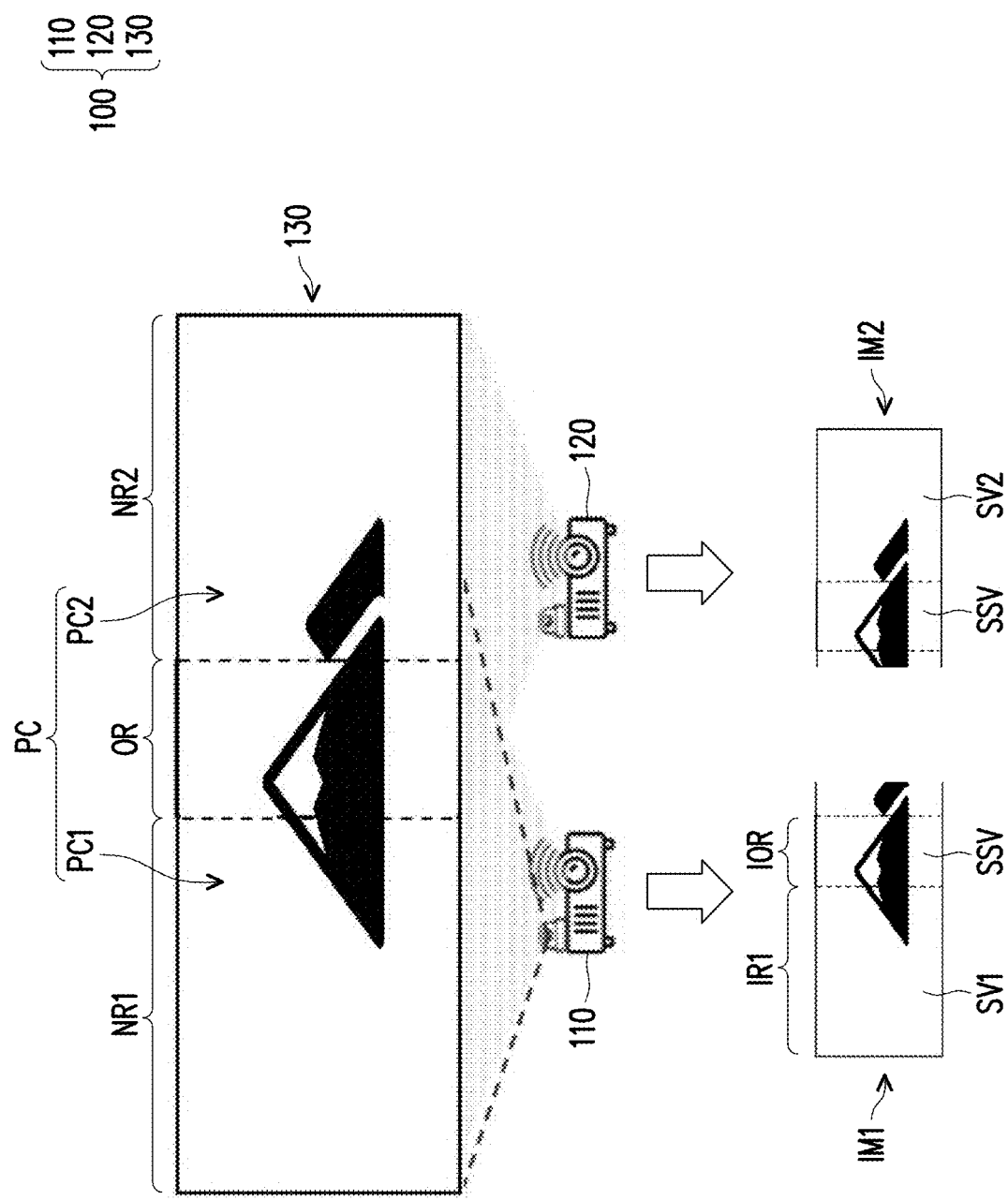
FIG. 1 is a schematic diagram illustrating a projection system according to an embodiment of the invention.

Referring to FIG. 1, FIG. 1 is a schematic diagram illustrating a projection system according to an embodiment of the invention. In FIG. 1, a projection system 100 includes a first projection device 110, a second projection device 120, and a projection surface 130. The first projection device 110 and the second projection device 120 have elements such as a camera, a light source, a light valve, and a projection lens, etc., respectively. The first projection device 110 and the second projection device 120 perform a projection fusion function cooperatively after being connected to each other. The connection may be wireless or wired.

Specifically, as shown in FIG. 1, the first projection device 110 and the second projection device 120 project a first display content PC1 and a second display content PC2 respectively onto the projection surface 130. The first display content PC1 and the second display content PC2 are fused into a complete display content PC presented on the projection surface 130. The complete display content PC includes an overlapping area OR formed by overlapping the first display content PC1 and the second display content PC2, which may be understood as an image fusion area of the first display content PC1 and the second display content PC2, a first non-overlapping area NR1 corresponding to a part of the first display content PC1, and a second non-overlapping area NR2 corresponding to a part of the second display content PC2.

As mentioned in the Description of Related Art, the image quality in the overlapping area OR may be prone to degradation due to a long-term usage or environmental factors. Therefore, the invention proposes a method for triggering projection fusion calibration which detects whether the image quality of the overlapping area OR is degraded and triggers the projection fusion calibration operation in a timely manner. The method for triggering the projection fusion calibration operation is further illustrated below.

Figure 2:
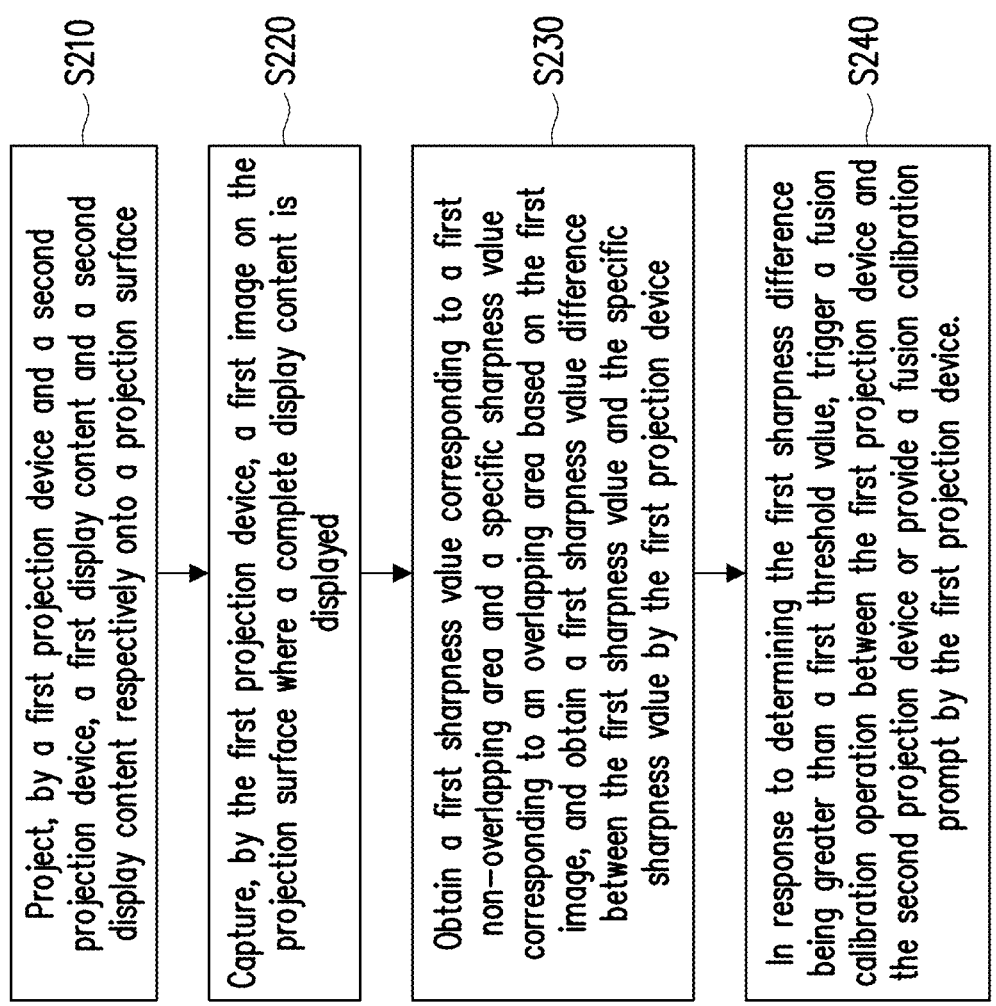
FIG. 2 is a flowchart illustrating a method for triggering projection fusion calibration according to an embodiment of the invention.

Referring to FIG. 2, FIG. 2 is a flowchart illustrating a method for triggering projection fusion calibration according to an embodiment of the invention. The method of this embodiment is executed by the projection system 100 in FIG. 1. The details of each step in FIG. 2 are described below with the elements shown in FIG. 2.

First, in Step S210, the first projection device 110 and the second projection device 120 project the first display content PC1 and the second display content PC2 respectively onto the projection surface 130, forming the complete projection content PC on the projection surface 130.

Next, in Step S220, the first projection device 110 may capture a first image IM1 on the projection surface 130 where the complete display content PC is displayed. For example, the first projection device 110 may capture the first image IM1 on the projection surface 130 through a built-in camera (not shown) of the first projection device 110. As shown in FIG. 1, the first image IM1 covers the overlapping area OR and the first non-overlapping area NR1, but the invention is not limited thereto.

Next, in Step S230, the first projection device 110 may obtain a first sharpness value SV1 corresponding to the first non-overlapping area NR1 and a specific sharpness value SSV corresponding to the overlapping area OR based on the first image IM1, and obtains a first sharpness value difference between the first sharpness value SV1 and the specific sharpness value SSV. "Sharpness value" in this embodiment is a parameter that is positively correlated with resolution and acutance.

In an embodiment, the first projection device 110 may obtain a first average image sharpness value corresponding to the first non-overlapping area NR1 in the first image IM1 as the first sharpness value SV1. For example, the first projection device 110 may identify the first image area IR1 corresponding to the first non-overlapping area NR1 in the first image IM1, and calculate an average image sharpness value of the first image area IR1 as the first average image sharpness value, which is the first sharpness value SV1. In addition, the first projection device 110 may obtain the specific average image sharpness value corresponding to the overlapping area OR in the first image IM1 as the specific sharpness value SSV. For example, the first projection device 110 may identify a specific image area IOR corresponding to the overlapping area OR in the first image IM1, and calculate the average image sharpness value of the specific image area IOR as the specific average image sharpness value, which is the specific sharpness value SSV. Next, the first projection device 110 may subtract the specific sharpness value SSV from the first sharpness value SV1 to obtain the first sharpness value difference, but the invention is not limited thereto.

After obtaining the first sharpness value difference, the first projection device 110 may determine whether the first sharpness value difference is greater than a first threshold.

In an embodiment, if the first sharpness value difference is not greater than the first threshold, the image quality difference between the first non-overlapping area NR1 and the overlapping area OR is not significant. Therefore, the first projection device 110 determines that the fusion calibration operation between the first projection device 110 and the second projection device 120 does not need to be triggered. Furthermore, if the first sharpness value difference is not greater than the first threshold, the flow may return to Step S220, where the first projection device 110 captures an image on the projection surface 130 where the complete display content PC is displayed after a predetermined time. Then, Step S230 and Step S240 are performed.

On the other hand, in Step S240, in response to determining that the first sharpness value difference is greater than the first threshold, the first projection device 110 triggers the fusion calibration operation between the first projection device 110 and the second projection device 120, or provides a fusion calibration prompt.

Specifically, when the first sharpness value difference is greater than the first threshold, the image quality of the first non-overlapping area NR1 and the overlapping area OR has a difference to a certain extent. In other words, the image in the overlapping area OR may be blurred or out of focus. Therefore, the first projection device 110 may correspondingly trigger the fusion calibration operation between the first projection device 110 and the second projection device 120 as an attempt to adjust the image quality of the overlapping area OR and facilitate the display effect of the complete display content PC.

In addition, when the first sharpness value difference is greater than the first threshold, the first projection device 110 may also provide the fusion calibration prompt, such as a prompt sound or text information presented in the first projection content PC1, which allows a user to decide whether to activate the fusion calibration operation between the first projection device 110 and the second projection device 120, but the invention is not limited thereto.

Based on the above, according to the method for triggering the projection fusion calibration of the invention, the first image IM1 on the projection surface 130 may be captured by the first projection apparatus 110, and the first sharpness value SV1 corresponding to the first non-overlapping area NR1 and the specific sharpness value SSV corresponding to the overlapping area OR may be obtained based on the first image IM1. Next, if the first sharpness value difference between the first sharpness value SV1 and the specific sharpness value SSV is greater than the first threshold, the first projection device 110 may trigger the fusion calibration operation accordingly or provide the fusion calibration prompt to adjust the image quality of the overlapping area OR.

In addition, although in each of the above embodiments, the first projection device 110 is configured as the main body for executing the method of the invention, in other embodiments, the method in FIG. 2 may also be executed by the second projection device 120. Specifically, in an embodiment, a built-in camera of the second projection device 120 may capture a second image IM2 on the projection surface 130 where the complete display content PC is displayed. Next, the second projection device 120 may obtain a second sharpness value SV2 corresponding to the second non-overlapping area NR2 and the specific sharpness value SSV corresponding to the overlapping area OR based on the second image IM2, and obtains a second sharpness value difference between the second sharpness value SV2 and the specific sharpness value SSV. Next, in response to determining that the second sharpness value difference is greater than the second threshold, which may be the same as or different from the first threshold, the second projection device 120 triggers the fusion calibration operation between the first projection device 110 and the second projection device 120, or provides a fusion calibration prompt. The details of the above embodiments are in the foregoing embodiments and are omitted herein.

In other embodiments, the first projection device 110 may also obtain the first sharpness value SV1 corresponding to the first non-overlapping area NR1 and the specific sharpness value SSV corresponding to the overlapping area OR in a different way. The following description is accompanied by FIG. 3 for further description.

Figure 3:
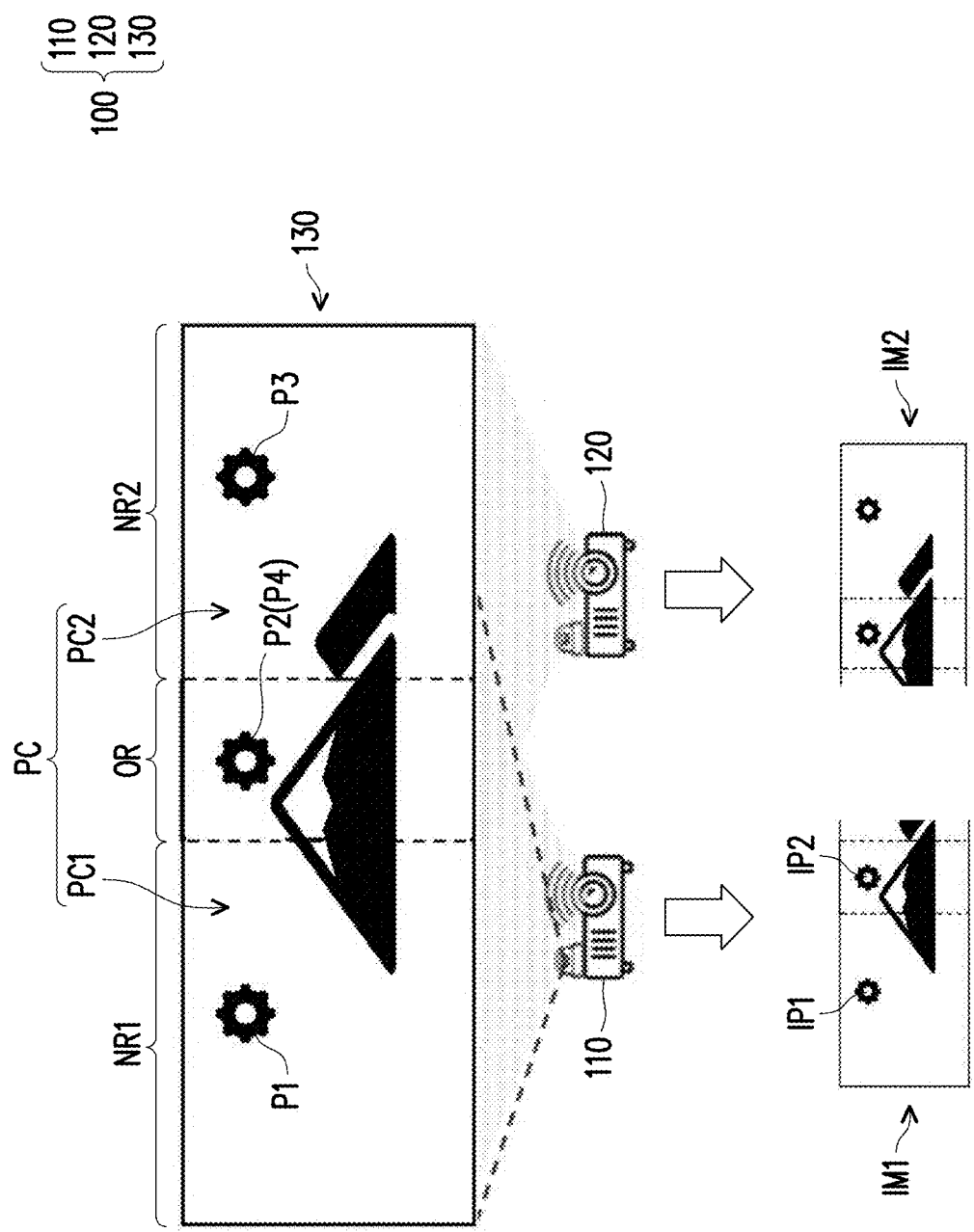
FIG. 3 is a schematic diagram of another projection system according to FIG. 1.

Referring to FIG. 3, FIG. 3 is a schematic diagram of another projection system according to FIG. 1. In this embodiment, the first display content PC1 projected by the first projection device 110 includes a first specific pattern P1 and a second specific pattern P2. The first specific pattern P1 is located in the first non-overlapping area NR1, and the second specific pattern P2 is located in the overlapping area OR. The first projection device 110 may capture the first image IM1 on the projection surface 130 where the complete display content PC is displayed. As shown in FIG. 3, the first image IM1 covers the overlapping area OR and the first non-overlapping area NR1.

Next, the first projection device 110 may obtain a first pattern sharpness value of the first specific pattern P1 in the first image IM1, and configure the first pattern sharpness value as the first sharpness value SV1 corresponding to the first non-overlapping area NR1. For example, the first projection device 110 may obtain a first average pattern sharpness value corresponding to the first specific pattern P1 in the first image IM1 as the first pattern sharpness value, which is the first sharpness value SV1.

In addition, the first projection device 110 may obtain a second pattern sharpness value of the second specific pattern P2 in the first image IM1, and configure the second pattern sharpness value as the specific sharpness value SSV corresponding to the overlapping area OR. For example, the first projection device 110 may obtain a second average pattern sharpness value corresponding to the second specific pattern P2 in the first image IM1 as the second pattern sharpness value, which is the specific sharpness value SSV.

Specifically, FIG. 3 shows that the first image IM1 captured by the first projection device 110 includes an image area IP1 corresponding to the first specific pattern P1 and an image area IP2 corresponding to the second specific pattern P2.

Therefore, the first projection device 110 may calculate an average sharpness value of the image area IP1 as the first average pattern sharpness value, which is the first sharpness value SV1. Similarly, the first projection device 110 may configure the average sharpness value of the image area IP2 as the second average pattern sharpness value, which is the specific sharpness value SSV. Next, the first projection device 110 may obtain a first sharpness value difference between the first sharpness value SV1 and the specific sharpness value SSV, and determine whether to trigger the fusion calibration operation between the first projection device 110 and the second projection device 120 or provide a fusion calibration prompt according to whether the first sharpness value difference is greater than the first threshold. The details in this regard will not be repeated in the following.

In other embodiments, the steps may also be performed by the second projection device 120. For example, the second projection device 120 may project a third specific pattern P3 and a fourth specific pattern P4, which may be the same as the second specific pattern P2, in a second display content PC2. The third specific pattern P3 may be located in the second non-overlapping area NR2, and the fourth specific pattern P4 may be located in the overlapping area OR.

After obtaining the second image IM2, the second projection device 120 may obtain a third pattern sharpness value of the third specific pattern P3 in the second image IM2, and configure the third pattern sharpness value as the second sharpness value SV2 corresponding to the second non-overlapping area NR2. Next, the second projection device 120 may obtain a fourth pattern sharpness value of the fourth specific pattern P4 in the second image IM2, and configure the fourth pattern sharpness value as the specific sharpness value SSV corresponding to the overlapping area OR. Next, the second projection device 120 may obtain a second sharpness value difference between the second sharpness value SV2 and the specific sharpness value SSV. Next, in response to determining that the second sharpness value difference is greater than the second threshold, the second projection device 120 triggers the fusion calibration operation between the first projection device 110 and the second projection device 120, or provides a fusion calibration prompt. The details of the embodiment have been described in the foregoing embodiments and therefore will not be repeated in the following.

In summary, according to the method for triggering the projection fusion calibration and the projection system of the invention, the first projection device obtains the first sharpness value corresponding to the first non-overlapping area and the specific sharpness value corresponding to the overlapping area based on the first image captured on the projection surface. Next, whether the image quality between the first non-overlapping area and the first overlapping area has a difference to a certain extent is determined according to the first sharpness value difference between the first sharpness value and the specific sharpness value. In an embodiment, if the first projection device determines that the first sharpness value difference is greater than the first threshold, the first projection device may determine that the image quality between the first non-overlapping area and the first overlapping area has a difference to a certain extent and trigger the fusion calibration operation accordingly or provide the fusion calibration prompt to adjust the image quality of the overlapping area, thereby facilitating the image display effect of the complete display content. Therefore, compared with the known method of determining whether the fusion calibration operation needs to be activated by human eye, the invention is capable of automatically maintaining the quality of a display content.

Although the invention has been disclosed in the above embodiments, it is not intended to limit the invention. Any person skilled in the art may make some changes and modifications without departing from the spirit and scope of the invention. Thus, the protection scope of the invention shall be subject to that defined by the appended claims. In addition, any of the embodiments or the claims of the invention are not required to achieve all of the objects or advantages or features disclosed herein. In addition, the abstract and title are used to assist in the search of patent documents and are not intended to limit the scope of the invention. In addition, the terms "first," "second" and the like mentioned in the specification or the claims are used only to name the elements or to distinguish different embodiments or scopes and are not intended to limit the upper or lower limit of the number of the elements.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and element in the present disclosure is intended to be dedicated to the public regardless of whether the element or element is explicitly recited in the following claims.

What is claimed is:

1. A method for triggering projection fusion calibration comprising:

projecting, by a first projection device and a second projection device, a first display content and a second display content respectively onto a projection surface, wherein the first display content and the second display content are fused into a complete display content presented on the projection surface, and the complete display content comprises an overlapping area formed by overlapping the first display content and the second display content and a first non-overlapping area corresponding to a part of the first display content;

capturing, by the first projection device, a first image on the projection surface where the complete display content is displayed;

obtaining a first sharpness value corresponding to the first non-overlapping area and a specific sharpness value corresponding to the overlapping area based on the first image, and obtaining a first sharpness value difference between the first sharpness value and the specific sharpness value by the first projection device; and in response to determining that the first sharpness value difference is greater than a first threshold, triggering a fusion calibration operation between the first projection device and the second projection device or providing a fusion calibration prompt by the first projection device.

2. The method according to claim 1, wherein obtaining the first sharpness value corresponding to the first non-overlapping area and the specific sharpness value corresponding to the overlapping area based on the first image by the first projection device comprises:

obtaining a first average image sharpness value corresponding to the first non-overlapping area in the first image as the first sharpness value; and obtaining a specific average image sharpness value corresponding to the overlapping area in the first image as the specific sharpness value.

3. The method according to claim 1, wherein obtaining the first sharpness value difference between the first sharpness value and the specific sharpness value comprises:

subtracting the specific sharpness value from the first sharpness value to obtain the first sharpness value difference.

4. The method according to claim 1, wherein the complete display content comprises a first specific pattern and a second specific pattern, the first specific pattern is located in the first non-overlapping area, the second specific pattern is located in the overlapping area, and obtaining the first sharpness value corresponding to the first non-overlapping area and the specific sharpness value corresponding to the overlapping area based on the first image by the first projection device comprises:
　　obtaining, by the first projection device, a first pattern sharpness value of the first specific pattern in the first image and configuring the first pattern sharpness value as the first sharpness value corresponding to the first non-overlapping area; and
　　obtaining, by the first projection device, a second pattern sharpness value of the second specific pattern in the first image and configuring the second pattern sharpness value as the specific sharpness value corresponding to the overlapping area.

5. The method according to claim 4, wherein obtaining the first pattern sharpness value of the first specific pattern in the first image by the first projection device comprises:
　　obtaining, by the first projection device, a first average pattern sharpness value corresponding to the first specific pattern in the first image as the first pattern sharpness value.

6. The method according to claim 4, wherein obtaining, by the first projection device, the second pattern sharpness value of the second specific pattern in the first image comprises:
　　obtaining, by the first projection device, a second average pattern sharpness value corresponding to the second specific pattern in the first image as the second pattern sharpness value.

7. The method according to claim 1, wherein the complete display content further comprises a second non-overlapping area corresponding to a part of the second display content, and the method further comprises:
　　capturing, by the second projection device, a second image on the projection surface where the complete display content is displayed;
　　obtaining a second sharpness value corresponding to the second non-overlapping area and the specific sharpness value corresponding to the overlapping area based on the second image, and obtaining a second sharpness value difference between the second sharpness value and the specific sharpness value by the second projection device; and
　　in response to determining that the second sharpness value difference is greater than a second threshold, triggering the fusion calibration operation between the first projection device and the second projection device or providing the fusion calibration prompt by the second projection device.

8. The method according to claim 7, wherein the complete display content comprises a third specific pattern and a fourth specific pattern, the third specific pattern is located in the second non-overlapping area, the fourth specific pattern is located in the overlapping area, and obtaining the second sharpness value corresponding to the second non-overlapping area and the specific sharpness value corresponding to the overlapping area based on the second image by the second projection device comprise:
　　obtaining a third pattern sharpness value of the specific pattern in the second image, and configuring the third pattern sharpness value as the second sharpness value corresponding to the second non-overlapping area by the second projection device; and
　　obtaining a fourth pattern sharpness value of the fourth specific pattern in the second image, and configuring the fourth pattern sharpness value as the specific sharpness value corresponding to the overlapping area by the second projection device.

9. A projection system comprising: a first projection device, a second projection device, and a projection surface, wherein the first projection device and the second projection device project a first display content and a second display content respectively onto the projection surface, the first display content and the second display content are fused into a complete display content presented on the projection surface, and the complete display content comprises an overlapping area formed by overlapping the first display content and the second display content and a first non-overlapping area corresponding to a part of the first display content;
　　wherein the first projection device is configured to:
　　　　capture a first image on the projection surface where the complete display content is displayed;
　　　　obtain a first sharpness value corresponding to the first non-overlapping area and a specific sharpness value corresponding to the overlapping area based on the first image, and obtain a first sharpness value difference between the first sharpness value and the specific sharpness value; and
　　　　in response to determining that the first sharpness value difference is greater than a first threshold, trigger a fusion calibration operation between the first projection device and the second projection device or provide a fusion calibration prompt.

10. The projection system according to claim 9, wherein the first projection device is configured to:
　　obtain a first average image sharpness value corresponding to the first non-overlapping area in the first image as the first sharpness value; and
　　obtain a specific average image sharpness value corresponding to the overlapping area in the first image as the specific sharpness value.

11. The projection system according to claim 9, wherein the first projection device is configured to:
　　subtract the specific sharpness value from the first sharpness value to obtain the first sharpness value difference.

12. The projection system according to claim 9, wherein the complete display content comprises a first specific pattern and a second specific pattern, the first specific pattern is located in the first non-overlapping area, the second specific pattern is located in the overlapping area, and the first projection device is configured to:
　　obtain a first pattern sharpness value of the first specific pattern in the first image, and configure the first pattern sharpness value as the first sharpness value corresponding to the first non-overlapping area; and
　　obtain a second pattern sharpness value of the second specific pattern in the first image, and configure the second pattern sharpness value as the specific sharpness value corresponding to the overlapping area.

13. The projection system according to claim 12, wherein the first projection device is configured to:
　　obtain a first average pattern sharpness value corresponding to the first specific pattern in the first image as the first pattern sharpness value.

14. The projection system according to claim 12, wherein the first projection device is configured to:
　　identify a second average pattern sharpness value corresponding to the second specific pattern in the first image as the second pattern sharpness value.

15. The projection system according to claim 9, wherein the complete display content further comprises a second non-overlapping area corresponding to a part of the second display content, and the second projection device is configured to:
- capture a second image on the projection surface where the complete display content is displayed;
- obtain a second sharpness value corresponding to the second non-overlapping area and the specific sharpness value corresponding to the overlapping area based on the second image, and obtain a second sharpness value difference between the second sharpness value and the specific sharpness value; and
- in response to determining that the second sharpness value difference is greater than a second threshold, trigger the fusion calibration operation between the first projection device and the second projection device or provide the fusion calibration prompt.

16. The projection system according to claim 15, wherein the complete display content comprises a third specific pattern and a fourth specific pattern, the third specific pattern is located in the second non-overlapping area, the fourth specific pattern is located in the overlapping area, and the second projection device is configured to:
- obtain a third pattern sharpness value of the specific pattern in the second image, and configure the third pattern sharpness value as the second sharpness value corresponding to the second non-overlapping area; and
- obtain a fourth pattern sharpness value of the fourth specific pattern in the second image, and configure the fourth pattern sharpness value as the specific sharpness value corresponding to the overlapping area.

* * * * *